(12) United States Patent
Hamm

(10) Patent No.: US 6,422,987 B1
(45) Date of Patent: *Jul. 23, 2002

(54) APPARATUS FOR PRODUCING RECLOSEABLE BAGS

(75) Inventor: Klaus Hamm, Weinstadt (DE)

(73) Assignee: Harro Hofliger Verpackungsmachinen GmbH, Allmersbach IM Tal (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,306

(22) Filed: Nov. 19, 1998

(30) Foreign Application Priority Data

Nov. 19, 1997 (DE) ..................... 297 20 469 U

(51) Int. Cl.⁷ .................. B21B 1/90
(52) U.S. Cl. ............. 493/214; 493/213; 493/394; 493/209
(58) Field of Search ............... 493/214, 213, 493/197, 394, 196, 195, 194, 193, 927, 209, 207, 206; 53/139.2

(56) References Cited

U.S. PATENT DOCUMENTS

| | | | | |
|---|---|---|---|---|
| 4,372,793 A | * | 2/1983 | Herz ................. | 156/66 |
| 4,630,429 A | * | 12/1986 | Christine ............ | 53/479 |
| 4,892,512 A | * | 1/1990 | Branson ............. | 493/194 |
| 5,019,027 A | * | 5/1991 | Boeckmann et al. ....... | 493/209 |
| 5,334,127 A | * | 8/1994 | Bruno et al. ............ | 493/194 |
| 6,044,621 A | * | 4/2000 | Malin et al. ........... | 493/214 |

FOREIGN PATENT DOCUMENTS

| | | | |
|---|---|---|---|
| CA | 2040587 | * | 4/1991 |
| CA | 2161833 | * | 10/1995 |
| DE | 19502228 | | 5/1996 |
| EP | 0453408 | | 4/1991 |
| EP | 0622169 | | 11/1994 |

* cited by examiner

Primary Examiner—Scott A. Smith
Assistant Examiner—Sameh Tawfik
(74) Attorney, Agent, or Firm—Darby & Darby

(57) ABSTRACT

An apparatus is provided for producing recloseable bags (10). The recloseable opening (32) of the bags is surrounded by mutually opposite halves (20, 22) of a recloseable strip, these halves being firmly welded to mutually opposite bag walls (12, 14) and, at the ends, being welded to the two lateral longitudinal sealed seams (16) of the bag (10). The apparatus is characterized, on the one hand, by at least one inner sealing jaw (72) between the two bag walls (12, 14) in the crossover region of the longitudinal sealed seam (16) and recloseable strip (18), and, on the other hand, by at least one counter-jaw (82, 84) on the outside of a bag wall (12, 14). The counter-jaw is located opposite the inner sealing jaw (72) such that, between the inner sealing jaw (72) and the counter-jaw (82, 84), it is possible to position a bag wall (12, 14) by way of its crossover region and to press flat the relevant half (20, 22) of the recloseable strip (18) and weld the same to the bag wall (12, 14).

25 Claims, 5 Drawing Sheets

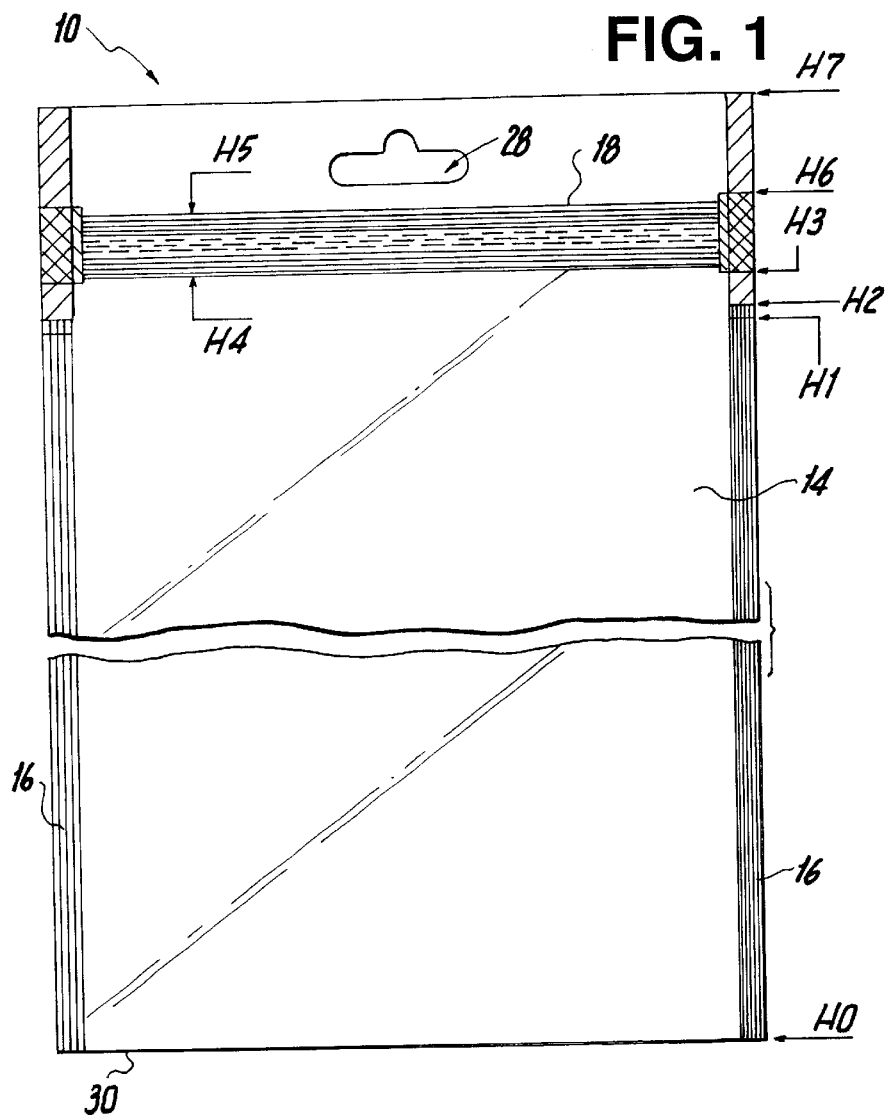
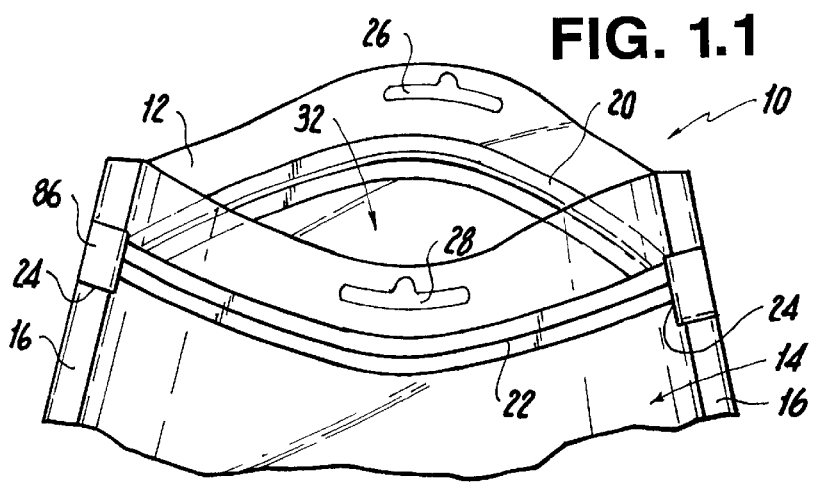

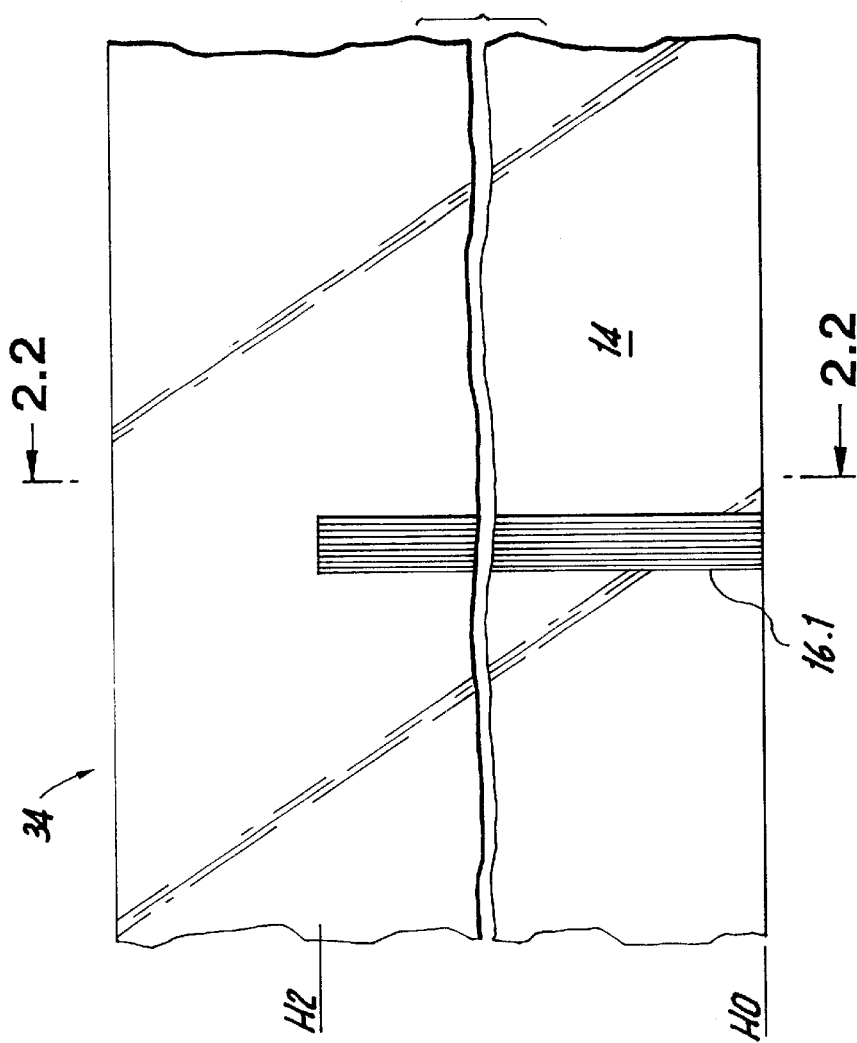
FIG. 2.1
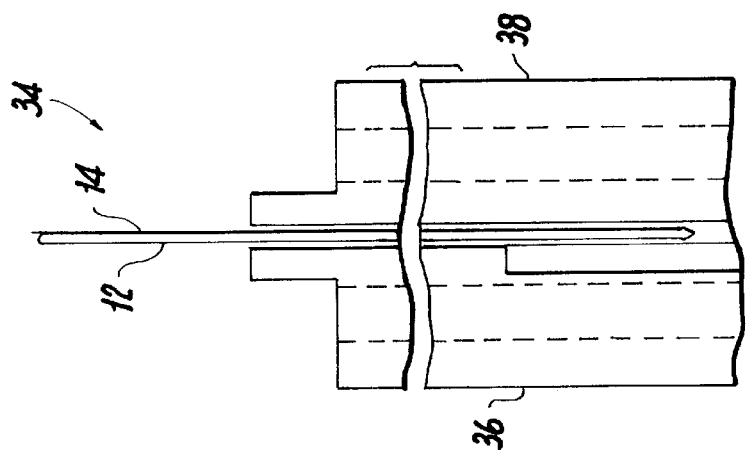
FIG. 2.2

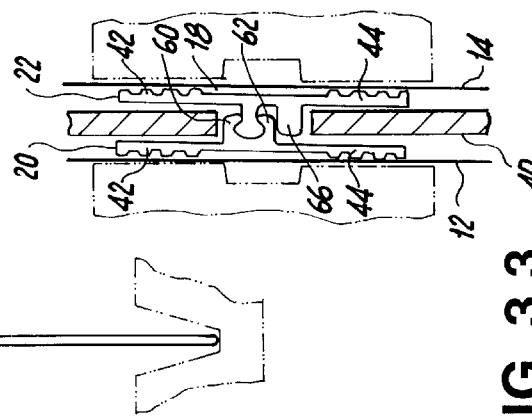
FIG. 3.2
FIG. 3.3
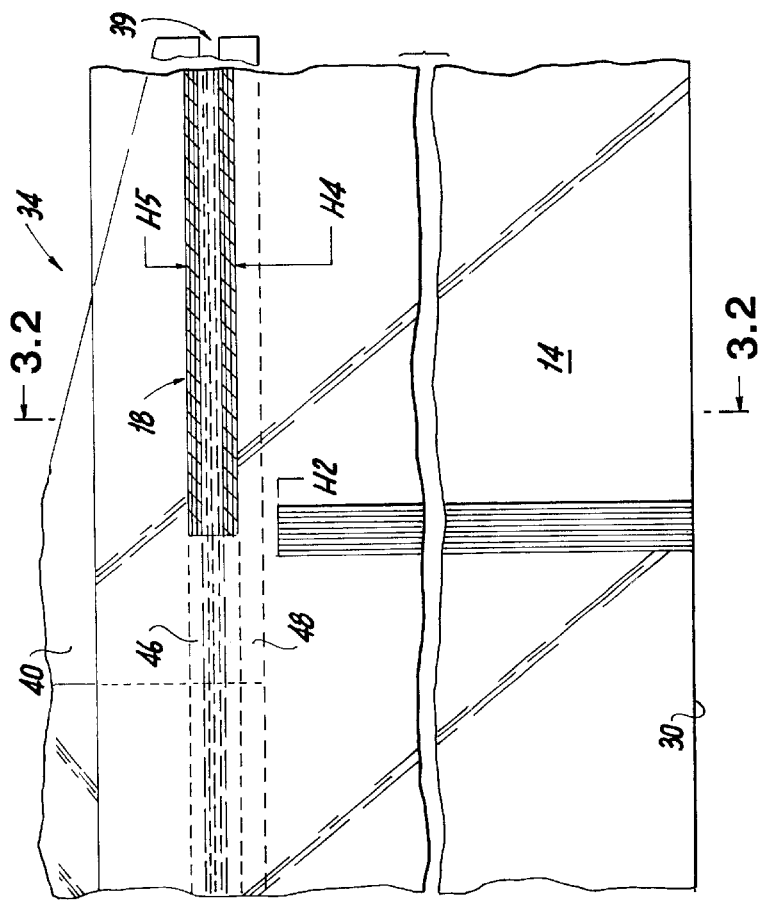
FIG. 3.1

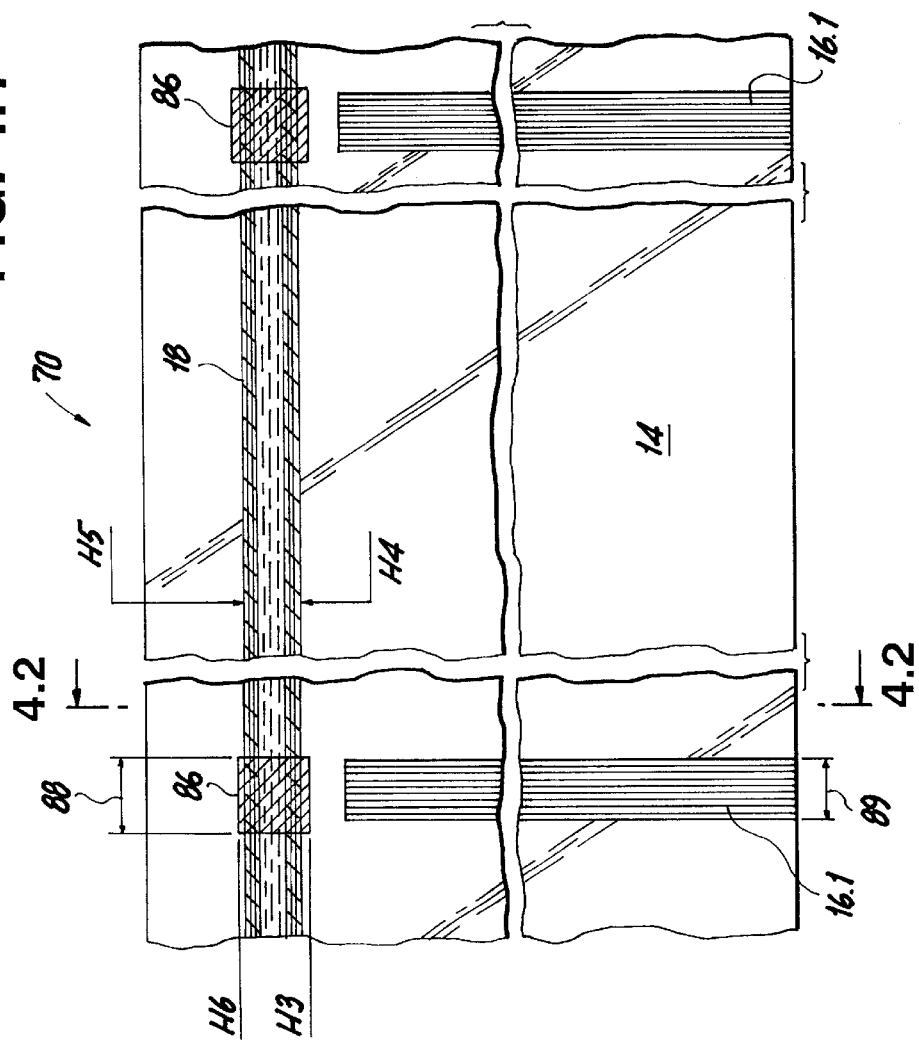
FIG. 4.1
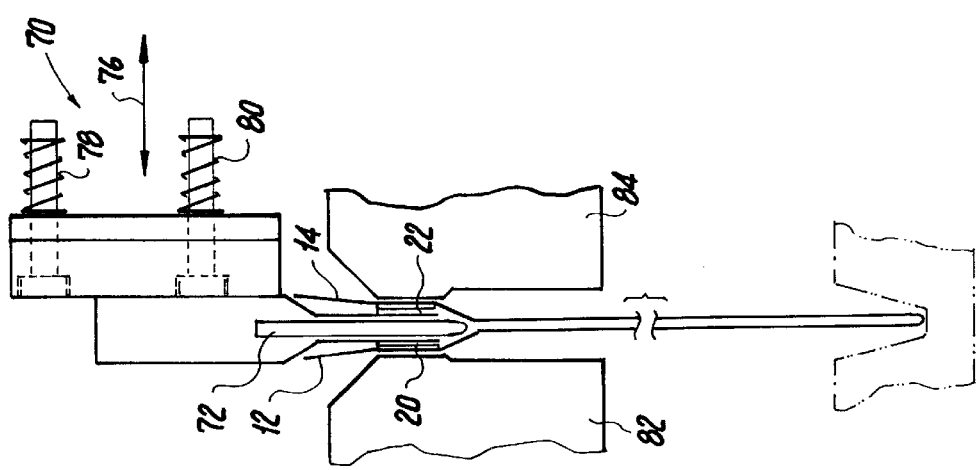
FIG. 4.2

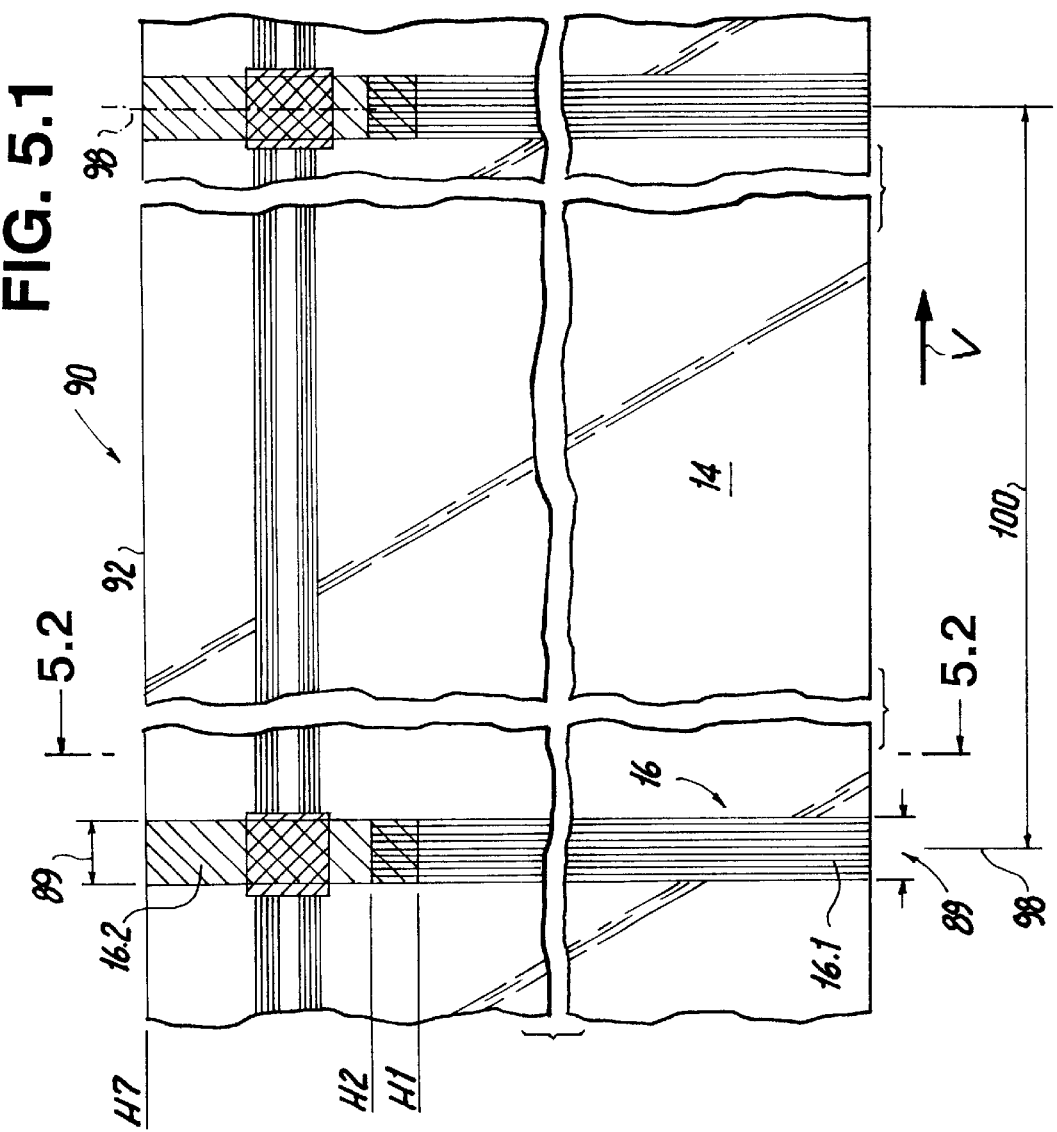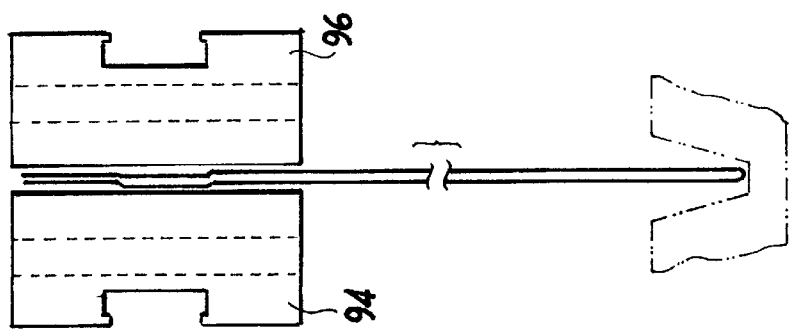

APPARATUS FOR PRODUCING RECLOSEABLE BAGS

BACKGROUND OF THE INVENTION

1. Field of the Invention

The invention relates to a possible way of producing recloseable bags. The bags may be flat bags or folded bottom bags. These bags, which are produced, for example, from a film material and are to be filled with foodstuffs, can be reclosed by means of a so-called recloseable strip provided in the top region of the bag walls. One half of said recloseable strip is firmly welded in one bag wall and the other half is firmly welded in the other bag wall. When the two halves, and thus the two bag walls, are pressed together, the two halves of the recloseable strip interengage so as to form a closure for the bag. The recloseable strip can be opened by the two bag walls being drawn apart from one another, that is to say the two halves of the recloseable strip are released from one another.

2. Brief Description of the Background of the Invention Including Prior Art

Flat bags and folded bottom bags may be produced from weldable plastic-web material. The recloseable strip is usually made of plastic. In order, then, to seal permanently the crossover region of the recloseable strip with the longitudinal sealed seams of the bag, a very large amount of heat energy has to be introduced there. This is also necessary as a result of the cross-sectionally bulky form of the two halves of the recloseable strip, these halves having to be welded in a liquid-tight manner to these longitudinal sealed seams. When the recloseable strip is opened, its two halves remain closed in the region of the longitudinal sealed seams, in order to prevent any leakage there.

The introduction of the heat energy which is required in these end regions of the recloseable strip takes a relatively long time. This means that the bag which is to be produced has to reside in this sealing station for a corresponding length of time. This impairs the performance.

In order to enhance the performance, the number of sealing stations may be increased. This makes it possible for heat to be introduced into this crossover region a number of times, on a progressive basis. The crossover region of the recloseable strip and sealed seams is sealed a number of times from the outside of the bag, and this introduces sufficient heat to the inside of the bag wall and thus into the region of the recloseable strip. As a result, the recloseable strip can be pressed flat and welded into the sealed seam. Since it involves more than more sealing station, this production process results in corresponding additional costs. A correspondingly large amount of space is also required. It is also disadvantageous that, as the number of sealing stations increases, there is also a corresponding increase in the number of reject bags when production is interrupted, since cooling of the sealed seam before it is finished off at the last sealing station renders the sealed seam incomplete. Since it is not possible to finish off the sealing operation subsequently, the bag cannot be used.

It is known to reduce the quantity of heat required in the crossover region by virtue of some of the materials which are to be welded being punched out in the crossover region. Thus, it is known to punch out part of the recloseable strip in the crossover region. This has great disadvantages if format adjustment is necessary. This is because it is very difficult and technically complex to perform the punching-out operations precisely at the desired location in each case; an excessively large punched-out section would result in leakages and an excessively small punched-out section would reduce the desired effect.

Also to be taken into account in all the above-mentioned production variants is the fact, which is fairly problematic from the technical point of view, that, when being drawn off from a roll on which it has been wound up, the recloseable strip expands to different extents. This means that it is barely possible, with the desired amount of precision, to introduce the recloseable strip precisely into the bag region where it is to be fastened on the bag walls.

SUMMARY OF THE INVENTION

1. Purposes of the Invention

The object of the invention is to specify an improved way of producing a recloseable bag by means of a recloseable strip.

These and other objects and advantages of the present invention will be come evident from the description which follows.

2. Brief Description of the Invention

This invention is realized, for an apparatus for producing recloseable bags by means of a recloseable strip. Two outer sealing jaws are disposed in a crossover region of a longitudinal sealed seam and of a recloseable strip for introducing heat through two bag walls of a bag from the outside for welding the bag walls to the recloseable strip. in a region of the longitudinal sealed seam. An inner sealing jaw is positionable between the two bag walls in the crossover region of the longitudinal sealed seam and of the recloseable strip. A counter-jaw is furnished on an outside of a bag wall, said counter-jaw being located opposite to said inner sealing jaw, such that the bag wall is positionable between the inner sealing jaw and the counter-jaw by way of a crossover region of the bag wall for pressing a relevant half-of a recloseable strip flat and for welding the relevant half of the recloseable strip to the bag wall. A recloseable opening of said bags is surrounded by halves of the recloseable strip. These mutually opposite halves are firmly welded to mutually opposite bag walls. These mutually opposite halves are welded at their ends to two lateral longitudinal sealed seams of the bag.

Rather than the heat being introduced just from the outside, that is to say by way of outer sealing jaws at least in the crossover region of the recloseable strip and longitudinal sealed seam, the invention provides that, in this crossover region, heat is also introduced from the inner region of the bag into the crossover region, and thus directly to the recloseable strip. In the case of the apparatus according to the invention, an inner sealing jaw will be positioned between the two bag walls in the crossover region of the longitudinal sealed seam and recloseable strip. This sealing jaw corresponds with counter-jaws positioned on the outside of the bag walls. The action of pressing the two counter-jaws together against the inner sealing jaw thus makes it possible to press flat the two halves of the recloseable strip and weld the same to the respective bag wall.

In order to avoid constraining forces when the counter-jaws are pressed together, the sealing jaw, which is positioned between the counter-jaws, is preferably mounted in a floating manner.

It is preferable for the two counter-jaws likewise to be heatable and thus to be designed as sealing jaws. This means that, rather than just acting on the recloseable strip and the bag walls from the outside, the heat can also act on these from the inside, and thus from both sides.

According to one advantageous embodiment of the apparatus according to the invention, this apparatus is distinguished by three sealing stations, through which the film web from which the bag is produced passes one after the other. In the first sealing station, the two halves of the recloseable strip are welded to the respective bag wall. For this purpose, the recloseable strip is in the closed state. This means that the two halves of the recloseable strip closely interengage. The welding takes place such that, in the region of the interengaging cross-sectional regions of the two halves of the recloseable strip, there is as little heat as possible in the region of the outer walls. The second sealing station has the two outer counter-jaws and the inner sealing jaw. Activation of the two counter-jaws and of the inner sealing jaw allows the recloseable strip, which is open in this station, to be pressed flat and in each case one half of the recloseable strip to be welded to the relevant bag wall by way of its pressed-flat region. In the third sealing station, the outer sealing jaws provided there produce the complete longitudinal sealed seam, that is to say in the crossover region of the recloseable strip and longitudinal sealed seam as well.

In order for it to be possible to weld the recloseable strip precisely to the bag walls, said strip is retained in a plate-like mount. This mount can pass into the space between the two bag walls from above and thus position the recloseable strip, which is in the closed state in the mount, precisely between the two bag walls. The activation of outer sealing jaws then results in the recloseable strip being welded to the bag walls. In this state, the bag is closed in the region of said recloseable strip.

The mount for the two halves of the recloseable strip can retain the recloseable strip in a positionable manner between the two bag walls. The mount can be a plate having a slot. The recloseable strip is retainable in the slot with interengaging halves of the slot in a closed state of the slot.

In order to prevent the two outer bag walls, or the two film webs, from slipping with respect to one another, and in order thus to avoid the situation where the parts of the welded recloseable strip do not fit precisely one into the other, it may be provided for a bottom section of the longitudinal sealed seam to be produced, in the bottom region of the bag, at the same time as, but preferably shortly before, the recloseable strip is welded to the bag walls. This bottom region of the longitudinal sealed seam does not reach as far as the region of the recloseable strip. It is thus still possible, once this bottom section of the longitudinal sealed seam has been produced, for the recloseable strip, which has been welded to the bag walls, to be opened in the region of the longitudinal sealed seam as well. This opening is necessary in order, with the aid of the inner sealing jaw, as has already been explained above, to press flat the two halves of the recloseable strip and firmly to weld these halves, in the open state in each case, to the bag walls. It is only then that, with an overlap with the bottom region of the longitudinal sealed seam, the rest of the longitudinal sealed seam is produced in the top region of the bag, and thus also in the crossover region with the recloseable strip.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 1 shows a schematic side view of a bag produced according to the invention;

FIG. 1.1 shows a plan view of part of an open bag according to FIG. 1;

FIG. 2.1 shows a view of a bag wall within the first sealing station, in which the bottom region of the longitudinal sealed seam is produced;

FIG. 2.2 shows a sectional illustration taken along the section line in FIG. 2.1;

FIG. 3.1 shows a view of the bag wall, still in the first sealing station, with top sealing jaws, by means of which a recloseable strip, which is retained in the closed state between the two bag walls by means of a retaining plate, is welded to the two bag walls;

FIG. 3.2 shows a sectional illustration taken along the section line in FIG. 3.1;

FIG. 3.3 shows an enlarged detail of the closed recloseable strip according to the illustration of FIG. 3.2;

FIG. 4.1 shows a view of the bag wall in a second sealing station, in which the two halves of the recloseable strip, which is open here, are pressed flat, and welded to the two bag walls, by means of an inner sealing jaw, which is positioned between the two halves, and by means of outer sealing jaws;

FIG. 4.2 shows a sectional illustration taken along the section line in FIG. 4.1;

FIG. 5.1 shows a view of the bag wall in a third sealing station, in which outer sealing jaws produce the top region of the longitudinal sealed seam, in the crossover region of the longitudinal sealed seam and recloseable strip as well, and FIG. 5.2 shows a sectional illustration taken along the section line in FIG. 5.1.

DESCRIPTION OF THE INVENTION AND PREFERRED EMBODIMENTS

A bag 10 has two walls 12, 14, which are firmly welded to one another on their left-hand and right-hand borders, as seen in the drawing, by a left and right longitudinal sealed seam 16. Arranged in the top region of the two walls 12, 14 is a recloseable strip 18, with the aid of which the two walls 12, 14 can be closed or opened in the region of said recloseable strip 18. For this purpose, the recloseable strip has its two halves 20, 22 welded to the relevant wall 12 or 14, respectively. In the region of the longitudinal sealed seams 16, the recloseable strip 18 is firmly welded in a liquid-tight manner to the two longitudinal sealed seams 16 and the two walls 12, 14. This crossover region 24 of the recloseable strip 18 and longitudinal sealed seam 16 is slightly thicker than the rest of the longitudinal sealed seam 16. Provided in the top region of each of the two walls 12, 14 is a hanging opening 26 and 28, respectively, these openings being located precisely opposite one another and together providing a means for hanging up the closed bag 10.

In the present case, the bag 10 is a flat bag. It is produced from a film web in one piece. During production, this single-piece film web is folded over about an edge running in the drawing-off direction of the web, and thus has a bottom longitudinal fold 30. The two walls 12, 14 constitute, in the transverse direction of the film 20 web, two halves of the film web and are connected integrally to one another via the longitudinal fold 30.

The bottom region of the bag 10 may be of different design, depending on the type of the design of the bottom of the bag in each case, a recloseable strip 18 is provided in the top region of the bags, in the region of the opening 52 of the relevant bag.

FIG. 1 specifies height markings of H0 to H7, which mark the heights of the various sealed sections on the bag 10, as is described in more detail hereinbelow.

Upon production of bags 10 from an endlessly wound-up film web, said film web is folded over about the longitudinal fold 30; this resulting in the mutually opposite regions of the film web being provided opposite one another as subsequent walls 12, 14. This V-shaped material web passes through three sealing stations one after the other.

Provided in the first sealing station 34 are a left-hand and a right-hand sealing jaw 36, 38, these sealing jaws being positioned on the outside of the two walls 12, 14. These two sealing jaws 36, 38 make it possible to produce, by welding the two welds 12, 14, the bottom section 16.1 of the longitudinal sealed seam 16 which will subsequently be provided on the bag 10. The bottom section 16.1 extends from H0 to H2. The top value H2 is located some way beneath the bottom border (H4) of the recloseable strip 18 which will subsequently be provided (FIG. 1).

In order to provide the recloseable strip 18, which is illustrated in stylized form as an H in FIG. 3.2, on the two walls 12, 14, it is located in the closed state in a longitudinal slit 39. This longitudinal lit 39 is made in a retaining plate 40. The material of the retaining plate 40 is thinner in the region of the top and bottom legs 42 and 44 of the two halves 20 and 22 of the recloseable strip 18; see thinner regions 46, 48 in FIG. 3.1. In the left-hand region of the retaining plate 40, said region not being illustrated in this drawing, the retaining plate is of tunnel-like design. This allows the recloseable strip 18 to be drawn along through the tunnel until, emerging from the tunnel, it is located in the longitudinal slit 39, with its outside approximately flush with the outside of the plate 40. Outer, left-hand and right-hand sealing jaws 50, 52, which are each provided with a longitudinal groove 54, 56, make it possible to weld the closed recloseable strip 18 to the two walls 12, 14 by way of its top and bottom legs 42, 44. The two longitudinal grooves 54, 56 in the two sealing jaws 50, 52 mean that heat will not pass directly into the region of the protrusions 60, 62, extending from the left-hand half 20, and the protrusions 64, 66, extending from the right-hand half 22. This means that these protrusions 60 to 66 are not deformed by heat as the rest of the recloseable strip 18 is welded to the walls 12, 14. This makes it possible for the recloseable strip 18, once it has-been welded to the wall 12, 14, to be opened by virtue of the two walls 12, 14 being drawn apart from one another.

The welding of the recloseable strip 18 takes place in the sealing station 34 at the same time as, or shortly after, the formation of the bottom section 16.1 of the longitudinal sealed seam 16 as has already been described above. The two walls 12, 14 can be drawn apart from one another in the state which is shown in FIG. 3. 1, that is to say in the region of the recloseable strip 18, while this is no longer possible in the bottom region of the two walls 12, 14, in the region of the bottom section 16.1 of the longitudinal sealed seam 16.

In the following, second sealing station 70, the two halves 20, 22 of the recloseable strip 18 are each pressed flat, with the result that the protrusions 60 to 66 on the two halves 20, 22 no longer extend from the legs 42, 44 in each case to the same extent as in the rest of the recloseable strip 18, which has not been pressed flat. At the same time, these pressed-flat regions of the recloseable strip 18 are also welded to the walls 12, 14 of the bag 10.

The central region of the recloseable strip 18 is pressed flat by an inner sealing jaw 72, which is introduced into the space between the two open halves 20, 22 of the recloseable strip 18 from above. This sealing jaw, by virtue of being fastened by means of helical springs 78, 80 arranged in the transverse direction 76, can be moved in this transverse direction 76 and is thus mounted in a floating manner.

Provided on the outside of the two walls 12, 14, opposite the inner sealing jaw 72 as seen in the transverse direction, are a left-hand sealing jaw 82 and a right-hand sealing jaw 84. Activation of the inner sealing jaw 72 and of the outer sealing jaws 82, 84 causes the two halves 20, 22 of the recloseable strip 18 to be pressed flat and further welded to the two walls 12, 14 in each case. Should the two sealing jaws 82, 84 be moved to different extents in the transverse direction as they are moved toward one another, the floating-type mounting of the sealing jaw 72 means that the latter is not subject to any lateral bending forces.

The sealing jaw 72 is mounted (in a manner which is not illustrated) such that it can be pivoted out of the region of the two walls 12, 14 in the upward direction.

That region on the walls 12, 14 which is subject to the action of the inner sealing jaw 72 and the outer sealing jaws 82, 84 can be seen in the form of a hatched rectangular region 86 in FIG. 4.1. This region 86 extends, heightwise, from H3 to H6 and thus overlaps in these directions the recloseable strip 18, which extends between the heights H4 and H5, in its central region provided between the bottom sections 16.1 of the longitudinal sealed seams 16. In the direction of the recloseable strip 18, said region 86 is of the width 88. The width 88 is greater than the width 89 of the bottom section 16.1 of the longitudinal sealed seams.

In a following, third sealing station 90, the longitudinal sealed seam 16 is extended upward, in the direction of the top border 92 of the bag 10. For this purpose, a left-hand sealing jaw 94 and a right-hand sealing jaw 96 are provided on the outside of the two walls 12, 14, and weld the two walls 12, 14 in a top section 16.2 of the longitudinal sealed seam 16. Said top section 16.2 overlaps the bottom section 16.1 and extends from H1 to the top border 92, equivalent to H7. The overlapping of the two sections 16.1 and 16.2 in the regions H1 to H2 ensures that these two sections 16.1 and 16.2 are joined in a sealed manner. The width 89 of the bottom section 16.1 corresponds to the width 89 of the top section 16.2.

Once the material web containing the walls 12 and 14 has been severed in the drawing-off direction V along longitudinal separating lines 98, which are provided in the central region of the longitudinal sealed seam 16, bags of width 100 are separated from the material web. The separated bags 10 may then, as is known per se, be subjected to further handling, for example filled.

In the region upstream of the second sealing station the recloseable strip 18 is in the closed state, which has already been described above, for example, in conjunction with the first sealing station (FIG. 3). In the second sealing station 70 the recloseable strip 18 is in the open state, in order to create space between its two halves 20, 22 for the inner sealing jaw 72. The recloseable strip 18 can be opened in a straightforward manner in that, in the drawing-off direction V (of the material web containing the walls 12, 14), a blocking element, for example a bar, is positioned from above in the region of the recloseable strip 18, between the two halves 20, 22 thereof. The action of the two halves 20, 22 being guided laterally pass the bar ensures continuous opening of the recloseable strip 18 during movement of the film web and of the recloseable strip 18. A further bar of this type is advantageously arranged downstream of the second sealing station 70, as seen in the drawing-off direction V. This ensures that the recloseable strip is open between these two bars, that is to say in the region of the second sealing station 70.

It will be understood that each of the elements described above, or two or more together, may also find a useful application in other types of bag-producing devices differing from the types described above.

While the invention has been illustrated and described as embodied in the context of an apparatus for producing recloseable bags, it is not intended to be limited to the details shown, since the various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An apparatus for producing recloseable bags comprising
    a first sealing jaw for flattening an end of a first strip part and furnished on an outside of a first bag wall; and
    a second sealing jaw for flattening an end of a second strip part and furnished on an outside of a second bag wall, wherein the first sealing jaw and the second sealing jaw are disposed in an overlap region of a longitudinal edge and of a recloseable strip for introducing heat through two bag walls of a bag from an outside for welding the bag walls to the recloseable strip in a region of the longitudinal sealed seam, an inner jaw positionable between the two bag walls in an overlap region of the longitudinal edge and of the recloseable strip;
    said first sealing jaw for pressing flat the first strip part being located opposite to said inner jaw, such that the bag wall is positionable between the inner jaw and the first jaw for pressing flat the first strip part by having an overlap region of the bag wall for pressing a relevant half of a recloseable strip flat and for welding the relevant half of the recloseable strip to the bag wall, wherein a recloseable opening of said bags is surrounded by halves of the recloseable strip, wherein these mutually opposite halves are firmly welded to mutually opposite bag walls, and wherein these mutually opposite halves are welded at their ends to two lateral longitudinal sealed seams of the bag,
    wherein the recloseable strip is comprised of the first strip part and the second strip part, the first strip part and the second strip part being flattened by the respective first sealing jaw and second sealing jaw in the overlap region of the longitudinal edge such that the first strip part and the second strip part are thinner in the overlap region than in a potion of the recloseable strip between the overlap regions.

2. The apparatus as claimed in claim 1 further comprising
    means for positioning the inner jaw in a movable manner between the first sealing jaw for pressing flat the first strip part and the second sealing jaw for pressing flat the second strip part.

3. The apparatus as claimed in claim 1, further comprising
    a first sealing station adapted for welding the two halves of the recloseable strip to the bag walls;
    a second sealing station supporting the inner jaw and the first sealing jaw for pressing flat the first strip part for pressing in each case said one half of the recloseable strip flat and for welding said pressed-flat one half region of the recloseable strip to the relevant bag wall;
    a third sealing station;
    a first strip end jaw for sealing the bag in an area of a strip end and with a second strip end jaw for sealing the bag in the area of the strip end supported by the third sealing station for producing a finished sealed seam.

4. The apparatus as claimed in claim 3, further comprising
    a first edge seam jaw (36) for sealing an edge seam of a bag and a second edge seam jaw (38) for sealing the edge seam of the baa for forming a first section of the longitudinal sealed seam, wherein a sealing region of the the first strip end jaw (94) for sealing the bag in the area of the strip end and with the second strip end jaw (96) for sealing the baa in the area of the strip end supported by the third sealing station overlaps with a sealing region of the the first edge seam jaw (36) for sealing the edge seam of the bag and the second edge seam law (38) for sealing the edge seam of the bag for a bottom section of the longitudinal sealed seam.

5. The apparatus as claimed in claim 4 wherein the first strip end jaw is a sealing jaw, and wherein the second strip end jaw is a sealing jaw.

6. The apparatus as claimed in claim 1, further comprising
    a mount for the two halves of the recloseable strip for retaining the recloseable strip in a positionable manner between the two bag walls;
    a third sealing jaw for attaching a first strip part to a first wall of a bag and a fourth sealing jaw for attaching a second strip part to a second wall of the bag for firmly welding the recloseable strip to the bag walls.

7. The apparatus as claimed in claim 6, wherein the mount is a plate having a slot, and wherein the recloseable strip is retainable in the slot with interengaging halves of the slot in a closed state of the slot.

8. The apparatus as claimed in claim 6 wherein the recloseable strip is drawn along through a tunnel and when emerging from the tunnel the recloseable strip is located in a longitudinal slit of the mount and wherein the outside of the strip is disposed substantially flush with an outside of the plate.

9. The apparatus as claimed in claim 6 wherein the third sealing jaw is furnished with a first longitudinal groove and wherein the fourth sealing jaw is furnished with a second longitudinal groove for welding the closed recloseable strip to the first wall and to the second wall with the top and bottom legs of the recloseable strip.

10. The apparatus as claimed in claim 9 wherein the first longitudinal groove and the second longitudinal groove assure that heat will not pass directly into the area of protrusions of the recloseable strip and wherein the protrusions are not deformed by heat as the rest of the recloseable strip is welded to the first wall or, respectively, to the second wall.

11. The apparatus as claimed in claim 1, further comprising
    a first edge seam jaw for sealing an edge seam of a bag and a second edge seam law for sealing the edge seam of the bag for forming a first section of the longitudinal sealed seam.

12. The apparatus as claimed in claim 11, further comprising
a third sealing jaw for welding a first strip part to a first wall of a bag and a fourth sealing jaw for welding a second strip part to a second wall of the bag disposed spaced apart, in a longitudinal direction of the longitudinal sealed seam for firmly welding the recloseable strip to the bag walls, wherein said third sealing jaw for welding the first strip part to the first wall of a bag and said fourth sealing jaw for welding the second strip part to the second wall of the bag are activatable simultaneously to shortly thereafter when the first edge seam jaw (36) for sealing an edge seam of a bag and a second edge seam jaw (38) for sealing the edge seam of the bag are activated.

13. The apparatus as claimed in claim 11 wherein the first edge seam jaw is a sealing jaw, and wherein the second edge seam jaw is a sealing jaw.

14. The apparatus as claimed in claim 1 wherein the inner jaw is a sealing jaw.

15. An apparatus for producing recloseable bags (10) in which the recloseable opening (32) of said bags is surrounded by mutually opposite halves (20, 22) of a recloseable strip (18), these halves being firmly welded to the mutually opposite bag walls (12, 14) and, at ends, being welded to two lateral longitudinal sealed seams (16) of the bag (10), having
first sealing jaw (82) for pressing flat a first strip part and second sealing jaw (84) for pressing flat a second strip part in a crossover region (86) of the longitudinal sealed seam (16) and recloseable strip (18) for the purpose of introducing heat through the two bag walls (12, 14) from the outside in order to weld the bag walls (12, 14) to the recloseable strip (18) in the region of longitudinal sealed seams (16),
wherein an inner jaw (72) for passing between the first strip part and the second strip part can be positioned between the two bag walls (12, 14) in the crossover region of the longitudinal sealed seam (16) and recloseable strip (18),
a first sealing jaw (82) for pressing flat the first strip part is provided on the outside of a bag wall (12, 14), said first sealing jaw being located opposite the inner jaw (72), such that, between the inner jaw (72) and the first sealing jaw (82) for pressing flat the first strip part, it is possible to position a bag wall (12, 14) by way of its overlap region (86) and to press flat the relevant half (20, 22) of the recloseable strip (18) to the bag wall (12, 14),
wherein the recloseable strip is comprised of the first strip part and the second strip part, the first strip part and the second strip part being flattened by the respective first sealing jaw and second sealing jaw in the crossover region of the longitudinal edge such that the first strip part and second strip part are thinner in the crossover region than in a potion of the recloseable strip between the crossover regions.

16. The apparatus as claimed in claim 15, wherein the inner jaw (72) can be positioned in a movable manner between the first sealing jaw (82) for pressing flat the first strip part and a second sealing jaw (84) for pressing flat the second strip part.

17. The apparatus as claimed in claim 15, wherein the first sealing jaw (82) for pressing flat the first strip part is constructed as a sealing jaw.

18. The apparatus as claimed in claim 15, wherein
there is a first sealing station (34) for the purpose of welding the two halves (20, 22) of the recloseable strip (18) to the bag walls (12, 14),
there is a second sealing station (70), with the inner jaw (72) and the first sealing jaw (82) for pressing flat the first strip part, for the purpose of pressing flat in each case one half (20, 22) of the recloseable strip (18) and welding said pressed-flat region of the recloseable strip (18) to the relevant bag wall (12, 14),
there is a third sealing station (90), with a first strip end jaw (94) for sealing the bag in an area of a strip end and with a second strip end jaw (96) for sealing the bag in the area of the strip end, for the purpose of producing the finished sealed seam (16).

19. The apparatus as claimed in claim 18, wherein a first edge seam jaw (36) for sealing an edge seam of a bag and a second edge seam jaw (38) for sealing the edge seam of the bag are provided for the purpose of forming a first section (16.1) of the longitudinal sealed seam (16); and
wherein a sealing region (16.2) of the first strip end jaw (94) for sealing the bag in the area of the strip end and with the second strip end jaw (96) for sealing the bag in the area of the strip end of the third sealing station (90) overlaps with the sealing region of the first edge seam jaw (36) for sealing the edge seam of the bag and the second edge seam jaw (38) for sealing the edge seam of the bag for the bottom section (16.1) of the longitudinal sealed seam (16).

20. The apparatus as claimed in claim 15, wherein
a mount (40) for the two halves (20, 22) of the recloseable strip (18) is provided such that the recloseable strip (18) is retained in a positionable manner between the two bag walls (12, 14),
a third sealing jaw (50) for welding a first strip part to a first wall of a bag and a fourth sealing jaw (52) for welding a second strip part to a second wall of the bag are provided such that the recloseable strip is firmly welded to the bag walls.

21. The apparatus as claimed in claim 20, wherein
the mount is furnished as a plate (40) which has a slit (39), the recloseable strip (18) can be retained in the slit (39) with its interengaging halves (20, 22) in the closed state.

22. The apparatus as claimed in claim 15, wherein
a first edge seam jaw (36) for sealing an edge seam of a bag and a second edge seam jaw (38) for sealing the edge seam of the bag are provided for the purpose of forming a first section (16.1) of the longitudinal sealed seam (16).

23. The apparatus as claimed in claim 22, wherein
a third sealing jaw (50) for welding a first strip part to a first wall of a bag and a fourth sealing jaw (52) for welding a second strip part to a second wall of the bag are disposed spaced apart, in the longitudinal direction of the longitudinal sealed seam (16) are provided for the purpose of firmly welding the recloseable strip (18) to the bag walls (12, 14),
said third sealing jaw (50) for welding the first strip part to the first wall of a bag and said fourth sealing jaw (52) for welding the second strip part to the second wall of the bag can be activated at a same time as, or shortly after, the first edge seam jaw (36) for sealing the edge seam of a bag and the second edge seam jaw (38) for sealing the edge seam of the bag.

24. An apparatus for producing recloseable bags comprising:

a first sealing jaw furnished on an outside of a first bag wall and for pressing flat a first strip part disposed in a region of overlap of a longitudinal edge and of an end of a first strip part;

a second sealing jaw furnished on an outside of a second bag wall and for pressing flat a second strip part disposed in the region of overlap of the longitudinal edge and of an end of a second strip part for introducing heat through two bag walls of a bag from an outside for welding the bag walls in a region of the longitudinal edge to an end region of the first strip part and of the second strip part;

an inner jaw positionable between the first strip part and the second strip part in an overlap region of the longitudinal edge and of the end of the first strip part and second strip part for pressing the end of the recloseable strip part flat and for welding the end of the recloseable strip part to the bag wall, wherein a recloseable opening of said bags is surrounded by the first recloseable strip part and by the second recloseable strip part, wherein the first recloseable strip part and the second recloseable strip part are firmly welded to mutually opposite bag walls, and wherein the first recloseable strip part and the second recloseable strip part are welded at their ends to two lateral longitudinal sealed seams of the bag, wherein the recloseable strip is comprised of the first strip part and the second strip part, the first strip part and the second strip part being flattened by the respective first sealing jaw and second sealing jaw in the region of overlap of the longitudinal edge such that the first strip part and second strip part are thinner in the region of overlap than in a potion of the recloseable strip between the regions of overlap.

25. The apparatus as claimed in claim 24 further comprising means for positioning the inner jaw in a movable manner between the first jaw for pressing flat the first strip part and the second jaw for pressing flat the second strip part.

\* \* \* \* \*